J. DOHERTY.
VARIABLE SPEED DEVICE.
APPLICATION FILED OCT. 25, 1919.

1,374,439.

Patented Apr. 12, 1921.

WITNESS:

INVENTOR.
John Doherty.
BY
Gifford & Bull,
ATTORNEYS

UNITED STATES PATENT OFFICE.

JOHN DOHERTY, OF NEW YORK, N. Y., ASSIGNOR TO MORRIS I. KOPPLE, OF FAR ROCKAWAY, NEW YORK.

VARIABLE-SPEED DEVICE.

1,374,439.  Specification of Letters Patent.  Patented Apr. 12, 1921.

Application filed October 25, 1919. Serial No. 333,174.

*To all whom it may concern:*

Be it known that I, JOHN DOHERTY, a citizen of the United States, residing at New York, in the county of Bronx and State of New York, have invented certain new and useful Improvements in Variable-Speed Devices, of which the following is a specification.

My present invention relates to variable speed devices and particularly such a device in which the driving diameter of a belt pulley may be shifted or changed to increase or decrease the speed of any machine to which the belt is connected.

One of the objects of my invention is to provide such a device which will be simple and effective in operation. Another object of my invention is to provide a belt tightener which will maintain a substantially constant tension on the belt as the driving diameter of the pulley is changed.

With this and other objects in view, my invention consists of certain novel features of construction, combination and arrangement of parts as will be more fully described and pointed out in the appended claims.

Figure 1:
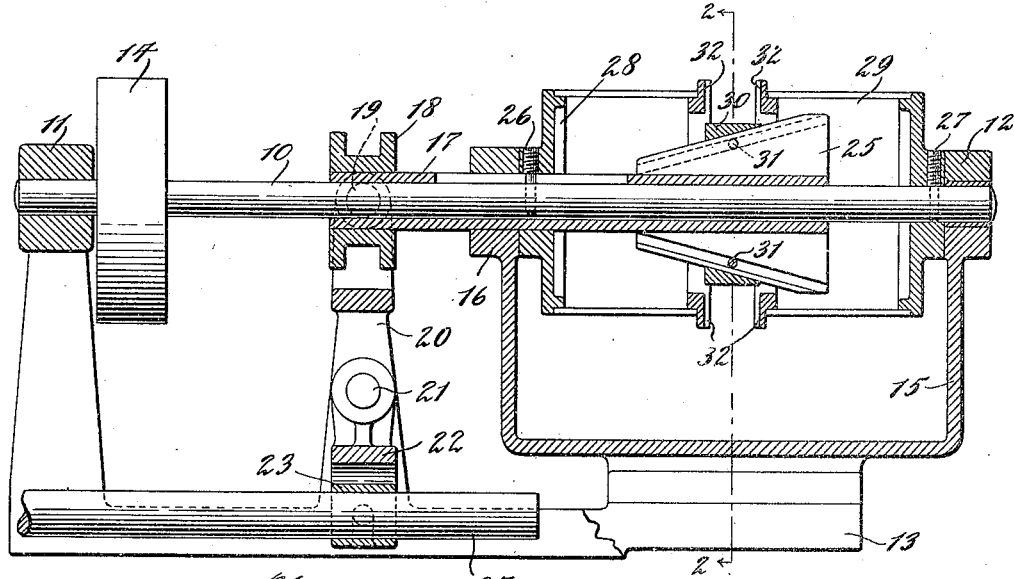
Figures 2, 3:
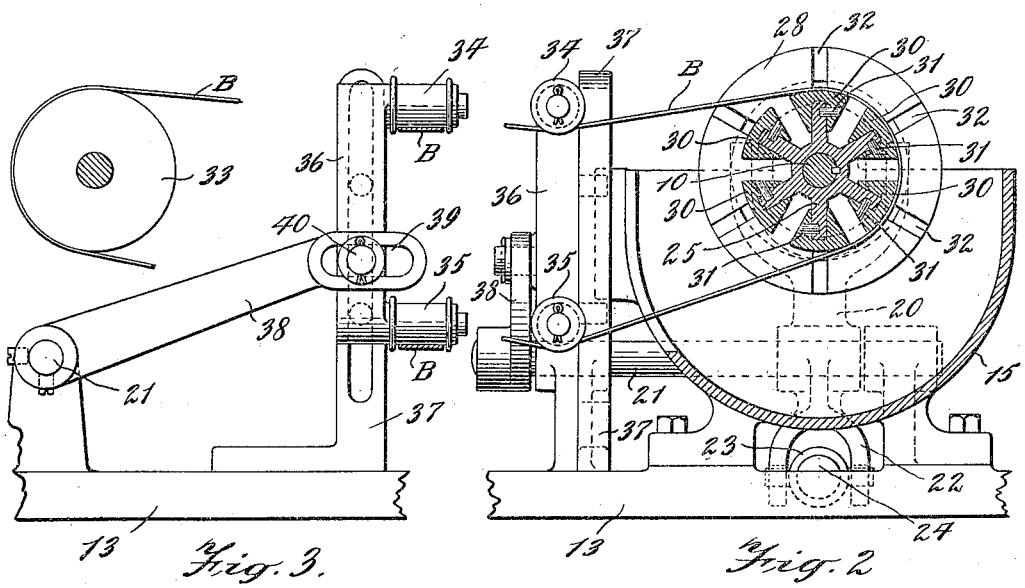

In the drawings, Figure 1 is a sectional side elevation of an illustrative form of my invention; Fig. 2 is a section on the line 2—2 of Fig. 1; and Fig. 3 is a side elevation showing the belt tightener.

The corresponding parts are referred to both in the specification and in the drawings by similar reference characters.

A driving shaft 10 has one end mounted in a bearing 11, and the opposite end in a bearing 12, these bearings being fastened to a bed plate 13. A driving pulley 14 is shown as one form of transmitting power to the shaft 10. It will be understood that any other form, such as a direct connected electric motor, may be used. The bearing 12 is supported in a bracket 15, the other side of which carries a bearing 16 through which passes a sleeve 17 surrounding the shaft 10 and longitudinally movable thereon, motion being given to the sleeve 17 by the spool 18 engaged by rollers 19 mounted on a lever 20 fastened to the shaft 21. In the particular embodiment illustrated, the shaft 21 is rotated by the motion of a lever 22 attached thereto, and having a nut 23 mounted therein, the screw 24, held against longitudinal motion, passing through the nut. When the screw 24 is rotated the nut 23 is moved bodily and, by its pin and slot connection to lever 22, the lever 22 is moved and thereby the shaft 21 is turned to move the spool 18 along the shaft 10.

Attached to the inner end of the sleeve 17 is a conical member 25 and surrounding the shaft and attached thereto through the driving pins 26, 27, is a pair of fixed members 28, 29, the inner faces of which are spaced apart, as shown in Fig. 1. Between these faces, and connected to the conical member 25, are a plurality of segments 30, 30, each of which is provided with a radial slot passing over a radial arm on the member 25, and also with a pin 31 engaging in a lateral slot in such arm. The segments 30 are located between the members 28 and 29 so that they may have radial movement therebetween and will also be rotated around the shaft 10 by virtue of the ends of the segments projecting into slots 32 in the inner faces of the fixed members 28 and 29.

With the construction so far described, it will be obvious that the belt B passing around the pulley made up of the segments 30 will be driven at a speed depending upon the position of the member 25, which in turn will be controlled by the screw 24. As the sleeve 17 is pulled, for instance, to the left of Fig. 1, the segments 30 will be moved outward so as to expand the driving diameter of the pulley. Similarly, when the sleeve 17 is moved to the right of Fig. 1, the segments 30 will be drawn inwardly to contract the diameter of the pulley and, therefore, to decrease the speed of the belt B.

As shown in Fig. 2, the belt B passes over a driven pulley 33, and it will be seen that as the driving pulley changes its size the belt B will become tighter or slacker, and this, of course, must be compensated for. To this end, I provide a belt tightener as a pair of pulleys 34, 35, each of which is in contact with the belt B, and I mount these pulleys on a vertically movable member 36 supported on a bracket 37 and controlled by an arm 38 having a slot 39 engaging with a pin 40 attached to the member 36. The lever 38 is attached to the shaft 21, and the parts are so proportioned that as the shaft 21 is rotated to change the position of the member 25 to alter the driving diameter of the pulley, the motion of the rollers 34, 35, will be such as to compensate for the increase or decrease in the slackness of the belt. Hence, the belt is automatically maintained at a constant tension no matter what changes may be made in the driving diameter of the pulley. While I have shown my variable diameter pulley as made up of a number of segments operating between a pair of fixed members, it will be obvious that any other form of expanding or contracting the segments will also be effective. It will also be observed that in my expansible pulley there are gaps formed between the segments of the pulley as the latter is enlarged, but particularly when using a light belt driven at high speeds such gaps are negligible in the operation of the device.

It will also be obvious that my automatic belt tightener may be used with any form of belt driving device in which the effective diameter of the driving pulley is altered so that the tension on the belt is thereby altered.

Preferably, I make the inner faces of the fixed members 28, 29, of such a diameter as to be larger than the largest possible diameter of the expansible pulley. These faces thus serve to locate the belt on the pulley at all times.

I claim:

1. A shaft, a pair of fixed members spaced apart thereon and connected thereto, a sectional driving pulley located between said fixed members, the sections of said pulley being mounted for radial movement between said members, a member movable longitudinally of said shaft and constructed and arranged to change the radial positions of said sections and thereby change the working diameter of said pulley, and means for moving said member while said shaft is in motion, said fixed members comprising drums arranged to inclose said movable member.

2. A driven pulley, a driving pulley, a belt therebetween, means whereby the operating diameter of said driving pulley may be changed, a belt tightener contacting with said belt, and means connected to said diameter-changing means to shift said belt tightener to maintain a substantially constant tension on said belt as the diameter of said pulley is changed.

3. A driven pulley, a sectional driving pulley, a belt therebetween, a member constructed and arranged to change the operating diameter of said driving pulley, an operating device connected to said member and adapted to move it while said driving pulley is in motion, a belt tightener in contact with said belt, and connections between said tightener and said operating device whereby the position of the belt tightener is changed in accordance with the change in diameter of said driving pulley to maintain a substantially constant tension on said belt.

4. A shaft, a sectional pulley thereon and driven thereby, a member movable longitudinally of the shaft and constructed and arranged to change the diameter of said driving pulley when said member is moved, an operating device to move said member while said shaft is in motion, a driven pulley, a belt connecting said pulleys, a belt tightener comprising a lever, and a member thereon contacting said belt and connections between said lever and said operating device, whereby the lever is turned to maintain a substantially constant tension on said belt as the diameter of said driving pulley is changed.

JOHN DOHERTY.

Correction in Letters Patent No. 1,374,439.

It is hereby certified that the name of the assignee in Letters Patent No. 1,374,439, granted April 12, 1921, upon the application of John Doherty, of New York, N. Y., for an improvement in "Variable-Speed Devices," was erroneously written and printed as "Morris I. Kopple," whereas said name should have been written and printed as *Morris D. Kopple*, as shown by the records of assignments in this office; and that the said Letters Patent should be read with this correction therein that the same may conform to the record of the case in the Patent Office.

Signed and sealed this 17th day of May, A. D., 1921.

[SEAL.]

T. E. ROBERTSON,
*Commissioner of Patents.*

Cl. 64—8.